C. A. PETERSEN.
SHOCK ABSORBER FOR AUTOMOBILES.
APPLICATION FILED NOV. 22, 1909.
970,390.
Patented Sept. 13, 1910.
3 SHEETS—SHEET 2.
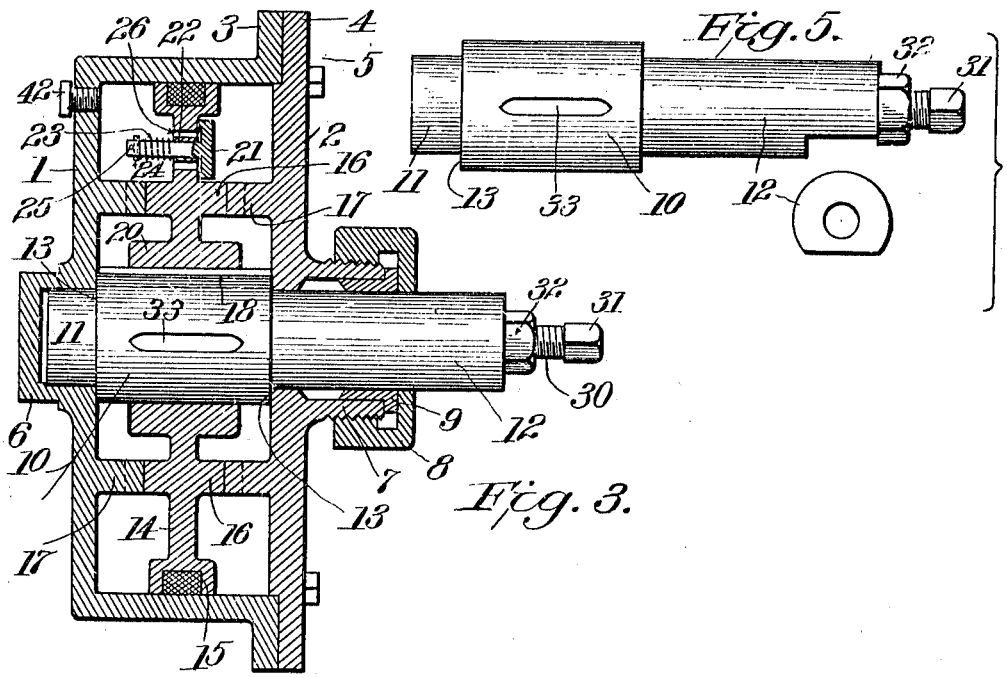
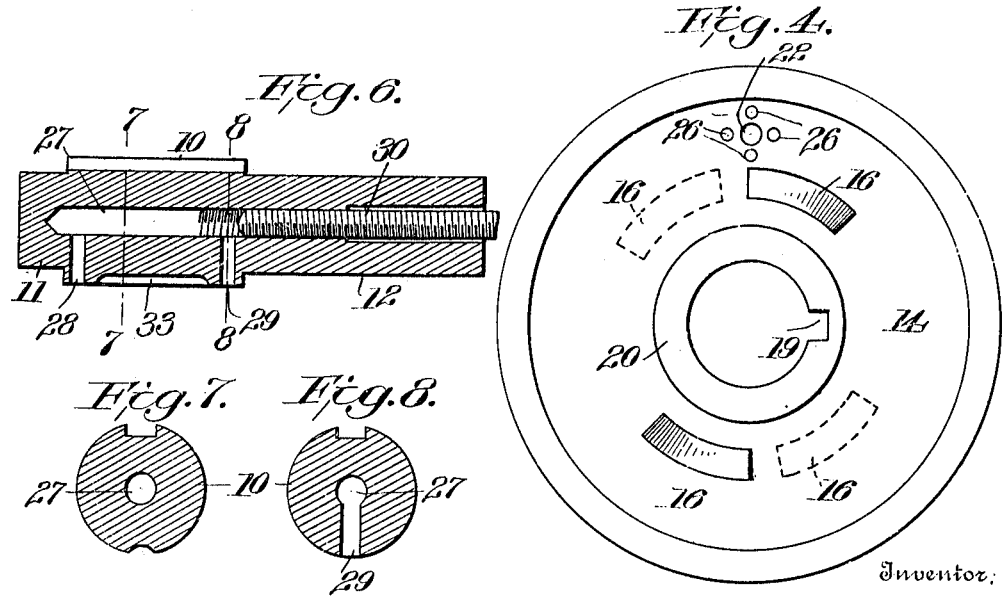

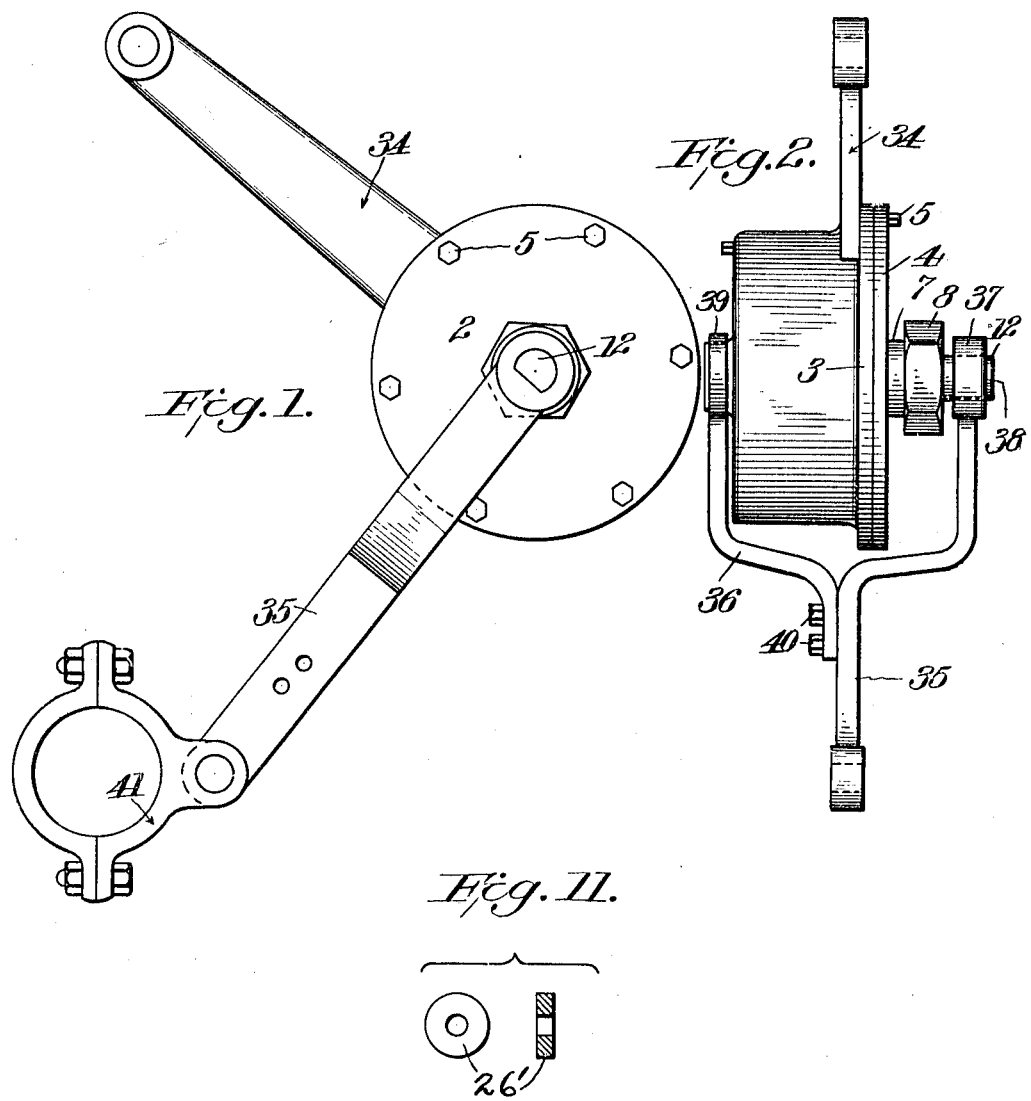

C. A. PETERSEN.
SHOCK ABSORBER FOR AUTOMOBILES.
APPLICATION FILED NOV. 22, 1909.
970,390.
Patented Sept. 13, 1910.
3 SHEETS—SHEET 3.
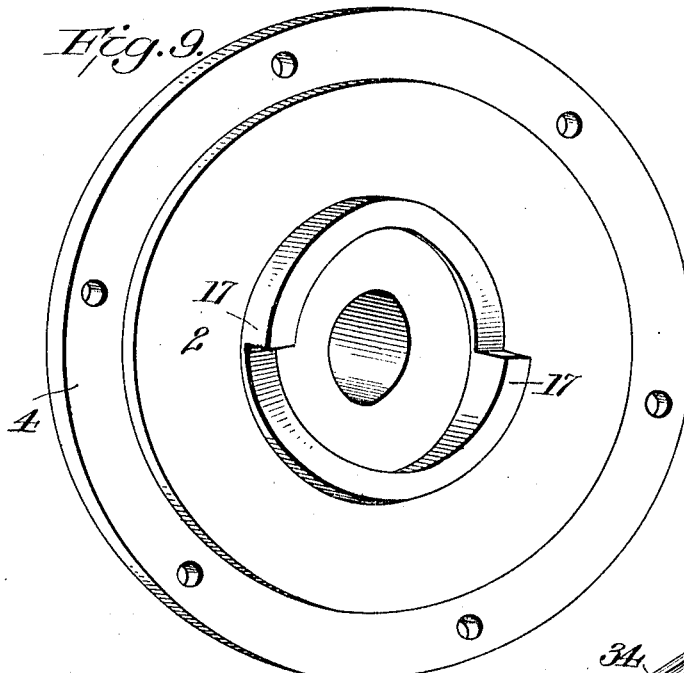
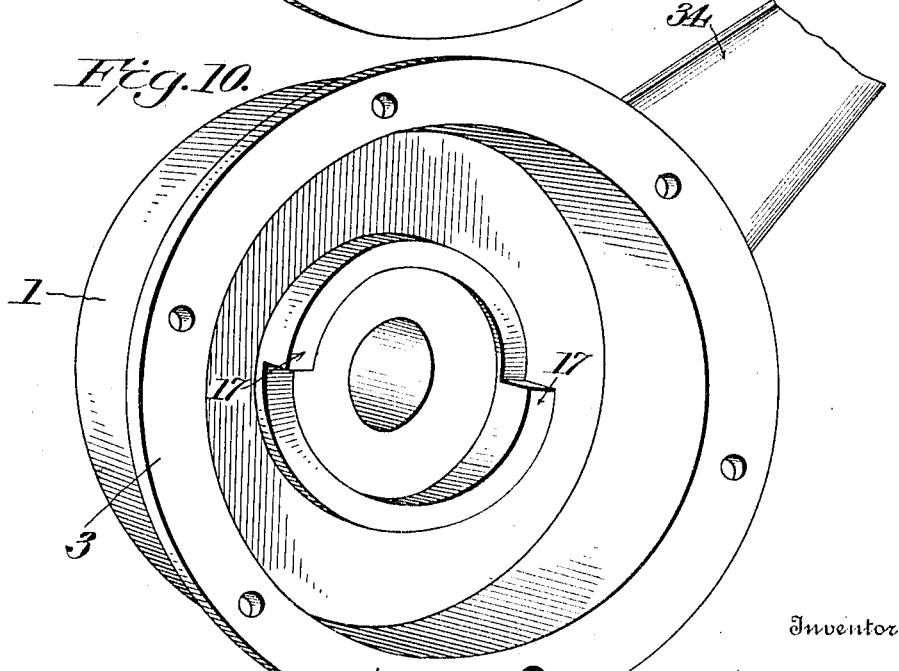

UNITED STATES PATENT OFFICE.

CRISTIAN ALFRED PETERSEN, OF LACONIA, NEW HAMPSHIRE.

SHOCK-ABSORBER FOR AUTOMOBILES.

970,390.  Specification of Letters Patent.  Patented Sept. 13, 1910.

Application filed November 22, 1909. Serial No. 529,457.

*To all whom it may concern:*

Be it known that I, CRISTIAN ALFRED PETERSEN, a subject of the King of Denmark, residing at Laconia, in the county of Belknap and State of New Hampshire, have invented certain new and useful Improvements in Shock-Absorbers for Automobiles, of which the following is a specification.

This invention relates to shock absorbers for automobiles.

The object of the invention is to provide a device of this character which may readily be attached to an automobile without requiring any change in the structural arrangement of its parts; which in operation shall be thoroughly efficient in absorbing jars and vibrations incident to the passage of the vehicle over the ground; and in which by novel means, the resistance of the attachment to yielding may readily be adjusted, whereby to adapt it to a vehicle carrying a light or heavy load.

With the above and other objects in view, as will appear as the nature of the invention is better understood, the same consists in the novel construction and combination of parts of a shock absorber, as will hereinafter be fully described and claimed.

In the accompanying drawings, forming a part of this specification, and in which like characters of reference indicate corresponding parts: Figure 1 is a view in side elevation, somewhat in the nature of a diagram, exhibiting the shock absorber, and the means by which it is attached to the axle and body of an automobile. Fig. 2 is an edge elevation of the device. Fig. 3 is a longitudinal sectional view through the device. Fig. 4 is an inside view, in elevation, of the piston. Fig. 5 is a collective view, exhibited somewhat diagrammatically, of the drive shaft of the device. Fig. 6 is a longitudinal sectional view through the drive shaft, showing more particularly the means by which the passage of the controlling fluid through the shaft may be regulated at will. Fig. 7 is a transverse sectional view taken on the line 7—7, Fig. 6. Fig. 8 is a similar view taken on the line 8—8, Fig. 6. Figs. 9 and 10 are perspective detail views of the casing members, viewed from the inside. Fig. 11 is a detail view of an attachment that may be employed to increase the resistance of the passage of the controlling fluid from one side to the other of the piston.

As shown in Fig. 3, the casing of the device consists of two members 1 and 2 each of which is provided with a flange 3 and 4 respectively which flanges are held assembled by bolts 5 as clearly shown in Figs. 1 and 2. The member 2 is in the nature of a disk, while the member 1 is in the nature of an open-ended cylinder. This arrangement is arbitrary, and may be varied if found necessary or advantageous. The member 1 is provided with an outstanding centrally-disposed hollow boss 6, and the member 2, with a similar boss 7, that is exteriorly threaded to be engaged by an interiorly threaded packing nut 8, a suitable packing 9 constituting, in conjunction with the nut, a stuffing box.

Arranged within the cylinder is a shaft 10 one end of which is reduced to provide a bearing 11 to engage the boss 6, and the other end 12 of which is reduced to fit within the stuffing box. This double reduction of the ends of the shaft will cause the center thereof to be of increased diameter, and the shoulders 13 presented by the enlargement form abutments that bear against the opposed faces of the casing members, and thus prevent the former from having any appreciable lateral play.

Mounted upon the enlarged portion of the shaft is a piston designated generally 14, the periphery of which is provided with a circumferential groove 15 to receive the packing, thus to insure a fluid-tight juncture with the walls, or rather the inner periphery of the member 1.

A feature that differentiates the present invention from the known art is that under the vibrations of the vehicle responsive to inequalities in a roadway, the piston is caused to have a positive reciprocatory movement longitudinally of the shaft to cause the cushioning fluid, which may be oil or any other agent adapted to the purpose, alternately to be forced from one side to the other of the piston, thus to insure even cushioning on the up and down movements of the vehicle-body. To accomplish this result, the piston has on opposite sides pairs of beveled abutments 16, of arcuate form, the center from which they are struck being that of the piston. These two sets of abutments, as shown in Fig. 4, are arranged in break-joint order, thus to insure a constant and even supply of the controlling fluid to each side of the piston. As shown in Fig. 9, the abutments are, when viewed from the edge of the piston, rhomboidal in shape, the inclined faces being oppositely disposed. The abutments are engaged by two-throw cams carried by the opposed faces of the casing members 1 and 2, which cams are of circular form, and may be either integral with the casing members, or secured thereto. In order to permit the piston to slide longitudinally of the shaft, the latter is provided with a key 18, commensurate in length with the enlarged portion of the shaft, and which engages a key-way 19 in the hub 20 of the piston.

One of the essential features of the invention is the provision of means whereby the cushioning-fluid may be forced from one side to the other of the piston. Three distinct means are herein shown for securing this result, the first of which is exhibited in Fig. 3, and which consists of the provision of a valve 21, the shank of which projects through an orifice 22 in the piston and carries opposite the valve-head a coiled spring 23, which bears at one end against the face of the piston and at its other end against a washer 24, which is held in position by a cotter-pin 25. Surrounding and concentric with the orifice 22 is a series of ports 26 which are normally closed by the valve-head 21. As will be apparent, this form of valve will control the passage of the fluid in one direction only; but should it be desired to cause the absorber to work with equal resistance on both motions of the vehicle a second valve-head 26', Fig. 11, may be employed, which will be disposed upon the valve-stem on the side of the piston opposite that engaged by the valve-head 21, and will be caused to cover the ports 26 by the spring 23.

The second means for permitting passage of the cushioning fluid from one side to the other of the cylinder is shown in Fig. 6, in detail, and in the other figures in elevation. This consists in providing the shaft with a bore 27 that terminates short of the reduced portion 11, the bore being intersected by two lateral ports 28 and 29. That portion of the bore contained within the reduced portion 12, and extending slightly past the port 29, is threaded for the reception of the bolt 30, having a wrench head 31, and being provided with a lock-nut 32 by which to retain the bolt 30 in any desired adjustment relative to the port 29. As will be obvious by reference to Fig. 6, longitudinal adjustment of the bolt 30 will adjust the area of the port 29 to cause it to present easy or restricted passage of the cushioning fluid, thus to adapt the device to be responsive to heavy or light loads. It will be understood, of course, that when the valve-head 26' is employed, the bolt 30 will be shifted to clear the port 29, thus to permit passage of fluid from one side to the other of the cylinder.

The third means provided for the passage of the cushioning fluid is shown in detail in Fig. 5, and consists in providing the enlarged portion of the shaft with any desired number of longitudinal grooves 33, which are preferably though not of necessity tapered at each end, and are slightly longer than the hub of the piston. By having the ends of the grooves tapered, when the piston is at the central portion of the enlarged section of the shaft, the piston will ride easily, but resistance to movement will progressively be presented as the piston approaches either of the reduced terminals of the grooves, and thus prevent too free yielding of the parts of the device.

The means for combining the attachment with an automobile comprises an arm 34 which is integral with the member 1 of the casing, and is secured at its free end in any preferred manner to the side of the body of an automobile. The other means of connection comprises two arms 35 and 36, the former of which is provided with a collar 37 that fits upon the outer end 38 of the shaft, the latter being flattened on one side to insure a non-rotatable connection between the parts. The arm 36 is provided with a collar 39, which is loosely journaled upon the boss 6, as clearly shown in Fig. 2. The two arms are bent so as to be spaced from the casing, the arm 36 being the shorter and being secured to the arm 35 by bolts 40, and the latter arm being provided at its lower terminal with a pivotally-connected split collar 41 by which the arm 35 is operatively connected with the axle of the vehicle. The casing member 1 is provided with a threaded opening that is engaged by a plug 42, and through the opening the fluid is supplied to the casing.

In the operation of the device, and under the vertical reciprocatory movements of the body of the vehicle, the shaft 10 is rotated through an arc corresponding to such movements, and this will cause the piston also to be rotated. During these movements, the abutments 16 will be caused to ride upon the faces of the two-throw cams 17, and this will cause the piston to reciprocate upon the shaft causing the fluid to be forced from one side to the other of the piston, through the various ports described, with the result that all jars on both the upward and downward movement of the vehicle body will efficiently be absorbed.

The advantage accruing from a lateral reciprocatory movement of the piston over a rotary motion is that the action is quicker and more positive, and requires less throw of the arms 35, resulting in more responsive and effective cushioning action.

Of course, it will be understood that all of the ports described for permitting passage of the fluid from one side to the other of the piston may be utilized, or any one or more of them as preferred, and as this will be obvious, detailed illustration of any other form than that shown is deemed unnecessary.

I claim:

1. A shock absorber comprising a casing, a piston therein provided on opposite sides with cam-faced abutments arranged in break-joint order, two-throw cams carried by the casing and engaging the abutments, a shaft loosely keyed to the piston, means for rotating the shaft whereby to cause the coaction between the abutments and the cams to impart a reciprocatory movement to the piston longitudinally of the shaft, and means for permitting passage of the fluid under gradually increasing resistance from one side to the other of the piston.

2. A shock absorber comprising a casing provided with a rigid arm for connection with the body of a vehicle, a shaft journaled within the casing, an arm rigid with the outer terminal of the shaft, means for pivotally connecting the latter arm with the axle of the vehicle, a piston loosely splined upon the shaft, means for imparting reciprocatory movements to the piston longitudinally of the shaft under the vibrations of the vehicle body, and means for permitting passage of fluid from one side to the other of the piston under vibrations of the vehicle body.

3. A shock absorber comprising a casing, a piston therein provided on opposite sides with cam-faced abutments arranged in break-joint order, two-throw cams carried by the casing and engaging the abutments, a shaft loosely keyed to the piston, means for rotating the shaft whereby to cause the coaction between the abutments and the cams to impart a reciprocatory movement to the piston longitudinally of the shaft, and means for permitting passage of the fluid from one side to the other of the piston during its reciprocatory movements.

4. A shock absorber comprising a casing provided with a rigid arm for connection with the body of a vehicle, a shaft journaled within the casing and provided with a polygonal terminal, an arm engaging the terminal, means for pivotally connecting the latter arm with the axle of a vehicle, a piston loosely splined upon the shaft, means for imparting reciprocatory movements to the piston longitudinally of the shaft under the vibrations of the vehicle body, and means for permitting passage of fluid from one side to the other of the piston under vibrations of the vehicle body.

5. A shock absorber comprising a casing composed of two members, one of which is provided with a hollow boss and the other with a stuffing-box, a shaft having reduced terminals engaging the boss and the stuffing-box and with an intermediate enlarged portion bearing against the opposed faces of the casing-members to prevent longitudinal movement of the shaft, a piston loosely splined upon the shaft, means for imparting reciprocatory movements to the piston longitudinally of the shaft, means for permitting passage of a fluid from one side to the other of the piston, and means for rotating the shaft.

In testimony whereof I affix my signature in presence of two witnesses.

CRISTIAN ALFRED PETERSEN.

Witnesses:
FRED JOHNSON,
CARL EIBYS.